United States Patent Office 3,538,143
Patented Nov. 3, 1970

3,538,143
PROCESS FOR THE PRODUCTION OF TRANS-CHRYSANTHEMIC ACID ETHYL ESTER
Masanao Matsui, Tokyo, and Kosuke Yoshioka, Hirakata-shi, Japan, assignors to Sumitomo Chemical Company, Ltd., Osaka, Japan, a corporation of Japan
No Drawing. Continuation-in-part of application Ser. No. 360,069, Apr. 15, 1964. This application Mar. 13, 1967, Ser. No. 622,406
Claims priority, application Japan, Apr. 23, 1963, 38/21,293
Int. Cl. C07c 69/74
U.S. Cl. 260—468                              12 Claims

ABSTRACT OF THE DISCLOSURE

A process for producing trans-chrysanthemic acid ethyl ester useful as an intermediate of pyrethroids, which comprises treating cis-chrysanthemic acid ethyl ester with 0.05 to 0.15 mol of an alkali metal ethoxide per 1 mol of cis-chrysanthemic acid ethyl ester in ethanol at a temperature ranging from 150° to 200° C. for 1 to 3 hours.

CROSS-REFERENCE TO RELATED APPLICATION

This application is a continuation-in-part application of U.S. Ser. No. 360,069, filed on Apr. 15, 1964, now abandoned.

BACKGROUND OF THE INVENTION

This invention relates to a novel process for producing trans-chrysanthemic acid ethyl ester. More particularly, it relates to a process for isomerizing cis-chrysanthemic acid ethyl ester to trans-chrysanthemic acid ethyl ester.

As is well-known, chrysanthemic acid (or chrysanthemum mono-carboxylic acid) is an acidic moiety of pyrethrin, cinerin, allethrin, cyclethrin, and other pyrethroids, forming the insecticidal esters with keto-alcohols of pyrethrolone, cinerolone, allethrolone, cyclethrolone, and their analogs, respectively.

Chrysanthemic acid ethyl ester obtained by the known method is a mixture of the stereo-isomers of trans-chrysanthemic acid ethyl ester and cis-chrysanthemic acid ethyl ester, the latter being an epimer of the former concerning $C_1$ carbon.

Among the isomers of chrysanthemic acid, however, the cis-isomer yields esters having inferior insecticidal activities, as compared with the trans-isomer.

Accordingly, it is desirable to convert less valuable cis-chrysanthemic acid ethyl ester to valuable trans-chrysanthemic acid ethyl ester.

There has been proposed a process for converting cis-chrysanthemic acid methyl ester into the corresponding trans-ester, which comprises subjecting the said cis-ester to the action of an alkali metal alkoxide (U.S. Pat. No. 3,046,299). By this method, pure trans-chrysanthemic acid ester can truly be obtained.

According to this prior method, however, it is necessary to use more than 1 mol of alkali metal tertiary alkoxide per mol of the cis-methyl ester. Moreover, the tertiary alcohol such as tertiary butanol and tertiary isoamyl alcohol, is so expensive that the method cannot be considered to be an advantageous one from the industrial point of view.

It has been ordinarily considered to be unable to convert cis-chrysanthemic acid ethyl ester to the trans-isomer by the aid of an alkali-metal ethoxide even though it is low-priced.

SUMMARY OF THE INVENTION

The present inventors have discovered that the cis-chrysanthemic acid ethyl ester can be completely isomerized to the trans-chrysanthemic acid ethyl ester by treating cis-chrysanthemic acid ethyl ester with a catalytic amount of an alkali-metal ethoxide in the presence of ethanol at a temperature ranging from 150° C. to 200° C. under atmospheric pressure. In this reaction, it is surprising that it is not necessary to use more than 1 mol of alkali metal ethoxide per mol of ester, and even by use of a catalytic amount of alkali metal ethoxide, the complete cis-trans isomerization can be effected.

It is an object of the present invention to provide a novel process for producing trans-chrysanthemic acid ethyl ester from the cis-isomer. It is another object to provide a process for isomerizing cis-chrysanthemic acid which is less useful than the trans-isomer as the acidic moiety of pyrethroids, to trans-chrysanthemic acid. Other objects will be apparent from the following description.

The present invention provides a process for converting cis-chrysanthemic acid ethyl ester into the corresponding trans-ester which comprises subjecting the said cis-ester to the action of a catalytic amount of an alkali metal ethoxide in the presence of ethanol at a temperature ranging from 150° to 200° C.

In carrying out the method of the present invention, cis-chrysanthemic acid ethyl ester to be treated may be either in pure state or a mixture with trans-chrysanthemic acid ethyl ester.

Ethanol is employed as a solvent in the process of the present invention in an amount of ranging from 0.5 to 10 times by weight, preferably from 2 to 3 times by weight, of the cis-ester or the mixture of the cis-ester and trans-ester.

According to the process of the present invention, the alkali metal ethoxide such as sodium or potassium ethoxide may be utilized.

The amount of the alkali metal ethoxide employed in the process of the present invention is in a range of 0.05 to 0.3 mol, preferably 0.05 to 0.15 mol, per 1 mol of cis-chrysanthemic acid ethyl ester or of a mixture of cis-chrysanthemic acid ethyl ester and trans-chrysanthemic acid ethyl ester.

In the process of the present invention it is preferable that absolute ethanol is employed. However, even if ethanol of 99.9% purity which contains 0.1% by weight of water as an impurity is employed for commercial purpose, it is possible to carry out the process of the present invention without any trouble if the amount of the alkali metal ethoxide employed is within the said range. There is no additional advantage to use the alkali metal ethoxide in an amount of more than 0.3 mol per 1 mol of cis-chrysanthemic acid ethyl ester.

The reaction temperature and the pressure are extremely important and essential factors.

The reaction temperature is chosen within a range of 150° C. to 200° C. The reaction velocity is extremely low at a temperature below such range. On the other hand, there is no additional advantage to raise the reaction temperature to so higher level than such range, for the purpose of the cis-trans isomerization.

The reaction pressure should be so chosen that the reaction temperature may be raised to the temperature range suitable to conduct the present isomerization reaction by raise of boiling point of ethanol.

The period of the reaction time is chosen within a range of 0.5 to 5 hours, preferably 1 to 3 hours.

As mentioned above, it is not only a great characteristic but also a great advantage of the process of the present invention that trans-chrysanthemic acid ethyl ester may be obtained in a lower cost than the prior art by treating cis-chrysanthemic acid ethyl ester with a catalytic amount of an alkali metal ethoxide which is easy to obtain.

In one embodiment of the procedure of the present invention, a mixture of chrysanthemic acid ethyl ester mainly composed of the cis-isomer, an alkali metal ethoxide and ethanol is charged into a stainless steel autoclave, which is then closed tightly and heated to reach desired temperature and pressure. An inert gas may be pressed into the autoclave prior to the heating of the reaction mixture, if desired. Thus, the reaction pressure is not critical in the present reaction and is difficult to define. It is merely kept at a level as occasion demands for maintenance of the identified temperature.

The reaction pressure reaches a level within a range of 10–29 atmospheric pressure to secure the reaction temperature in a range of 150° C. to 200° C.

Because of the alkali metal ethoxide as reagent, the objective product, trans-chrysanthemic acid ethyl ester may sometimes be partly hydrolyzed to the free acid during the reaction or the after-treatment according to the conditions of the procedure.

Although it is possible to obtain trans-chrysanthemic acid ethyl ester without hydrolysis, it is not necessary in general to completely prevent the hydrolysis during the procedure. Since trans-chrysanthemic acid can be purified through crystallization, even the trans-chrysanthemic acid ethyl ester remaining unhydrolyzed is preferably hydrolyzed afterwards for the purification.

After the reaction is completed, accordingly, ethanol used is removed from the reaction mixture, for example, by evaporation. Then, the residue is treated with water to decompose the alkali metal ethoxide. Chrysanthemic acid ethyl ester substantially composed of the trans-isomer is obtained from the neutral organic layer, and, as the case may be, the corresponding acid is obtained from the aqueous layer by acidifying it with an inorganic acid.

In another way, the reaction mixture may directly be refluxed with an aqueous alkali hydroxide solution to hydrolyze chrysanthemic acid ethyl ester. Ethanol is removed from the mixture, then the residue is treated with cold water whereby a clear solution is obtained. Chrysanthemic acid substantially composed of the trans-isomer is obtained from the solution by acidifying it with an inorganc acid. The conversion of the cis-trans isomerization is almost quantitative.

As mentioned minutely above, the conversion of cis-chrysanthemic acid ethyl ester to its trans-isomer according to the method of the present invention is quite advantageous and useful in that the method permits the trans-conversion by use of an alkali-metal ethoxide for the first time and that the conversion can be effected by a catalytic amount of such ethoxide.

On the other hand, if a catalytic amount of tertiary butoxide is used, even though cis-chrysanthemic acid ethyl ester is treated at a temperature from 185° to 190° C. in tertiary butanol, the trans-ester is difficultly obtained as shown in the following comparative experiment 1.

Further if cis-chrysanthemic acid methyl ester is applied to the treatment similar to that of the present invention, it is considerably less heat-stable than ethyl ester and the cis-trans isomerization reaction difficultly proceeds as shown in the following comparative experiment 2.

Comparative experiment 1

In a stainless steel autoclave 20 grams (0.102 mol) of a mixture of ethyl chrysanthemate including 27% of the total amount of cis-ester and 72% of the total amount of trans-ester were dissolved in the solution consisting of 40 ml. of absolute tertiary butanol and 0.015 mol of potassium tertiary butoxide prepared by a known manner and the autoclave was tightly closed and heated at 185° to 190° C. for 2 hours. After cooling, the reaction mixture was concentrated on a water bath under reduced pressure.

To the resulting residue excess sodium hydroxide aqueous solution was added and the mixture was refluxed under stirring for 3 hours with removing produced ethanol from the mixture.

The aqueous mixture was acidified with 10% sulfuric acid to isolate an oily layer, which was extracted with ethyl ether. The ether layer was dried over anhydrous sodium sulfate and ether was removed. Thus obtained crude product was refined by distillation under reduced pressure, to yield a mixture of trans-chrysanthemic acid and cis-chrysanthemic acid, M.P. 40° to 71° C. It was shown by infrared absorption spectrum that the obtained mixture of chrysanthemic acid consisted of

| | Percent |
|---|---|
| Trans-chrysanthemic acid | 75 |
| Cis-chrysanthemic acid | 23 |

Comparative experiment 2

A mixture of 18.2 g. (0.1 mol) of methyl-cis-chrysanthemate, 40 ml. of methanol and 0.54 g. (0.01 mol) of sodium methoxide was charged into a stainless steel autoclave, which was then tightly closed and heated at 190° C. for 2 hours. After cooling, a tarry substance which was not dissolved in the reaction medium was given. The tarry substance was extracted with aqueous solution of sodium hydroxide. However a greater part of the tarry substance remained insoluble in the aqueous solution, and the residue was not able to be identified. From the aqueous solution, trace of cis-chrysanthemic acid was obtained after acidifying with hydrochloric acid, M.P. 112° 114° C.

DESCRIPTION OF THE PREFERRED EMBODIMENTS

The following examples are given in order to explain the invention much in detail but not to limit the invention.

EXAMPLE 1

A mixture of 20 g. (0.102 mol) of cis-chrysanthemic acid ethyl ester, 40 ml. of absolute ethanol and 0.68 g. (0.0102 mol) of sodium ethoxide was charged into a stainless steel autoclave, which was then tightly closed and heated at 190° C. for 2 hours. After cooling, the reaction mixture was refluxed with 50 ml. of 10% aqueous sodium hydroxide solution for 2 hours. The ethanol was removed from the mixture in vacuo, the residue was added with 100 ml. of water and further the ethanol was removed in vacuo.

The residue was added with cold water, whereby a clear solution was obtained, which was then acidified with 10% sulfuric acid to isolate an oily layer, which was extracted with ethyl ether. The ether layer was dried over anhydrous sodium sulfate and the ether was removed. Thus obtained 18 g. of oily substance was cooled and allowed to stand to yield crystalline solid, M.P. 48°–53° C.

Upon purification through distillation in vacuo, the product showed B.P. 132° C./7 mm. Hg as a colorless oil and M.P. 48°–53° C. which showed no depression of the melting point when mixed with the authentic trans-chrysanthemic acid specimen, and no difference was seen between the product and the authentic specimen in their infrared spectra.

EXAMPLE 2

Twenty grams (0.102 mol) of a mixture of ethyl chrysanthemate including 27% of the total amount of cis-ester and 72% of the total amount of trans-ester, 40 ml. of absolute ethanol and 1.0 g. (0.015 mol) of sodium ethoxide were charged into a stainless steel autoclave, which was then tightly closed and heated at 180° C. for 2 hours. After cooling, the reaction mixture was refluxed with excess sodium hydroxide aqueous solution for 2 hours. Ethanol was removed from the mixture in vacuo, the residue was added to 40 ml. of water and further ethanol was removed in vacuo.

The residue was added to cold water, whereby a clear solution was obtained, which was then acidified with 10% sulfuric acid to isolate an oily layer, which was extracted with ethyl ether. The ether layer was dried over anhydrous sodium sulfate and ether was removed. Thus obtained crude chrysanthemic acid was refined by distillation in vacuo, to yield 16 g. of a mixture of trans-chrysanthemic acid and cis-chrysanthemic acid, M.P. 48°–52° C.

It was shown by infra red absorption spectrum analysis that the obtained mixture of chrysanthemic acid consisted of

| | Percent |
|---|---|
| Trans-chrysanthemic acid | 98 |
| Cis-chrysanthemic acid below | 1.8 |

We claim:
1. A process for converting cis-chrysanthemic acid ethyl ester into the corresponding trans-ester, which comprises subjecting the said cis-ester to the action of 0.05 to 0.3 mol of an alkali metal ethoxide per 1 mol of the said cis-ester in the presence of ethanol at a temperature ranging from 150° to 200° C.

2. A process for the production of trans-chrysanthemic acid, which comprises converting cis-chrysanthemic acid ethyl ester into the corresponding trans-ester by subjecting the said cis-ester to the action of 0.05 to 0.3 mol of an alkali metal ethoxide per 1 mol of the said cis-ester in the presence of ethanol at a temperature ranging from 150° to 200° C., isolating the trans-ester from the reaction mixture and subjecting it to saponification.

3. A process for converting cis-chrysanthemic acid ethyl ester in a state of a mixture with trans-chrysanthemic acid ethyl ester into trans-chrysanthemic acid ethyl ester, which comprises subjecting the said mixture of the cis-ester and the trans-ester to the action of 0.05 to 0.3 mol of an alkali metal ethoxide per 1 mol of the said mixture of the cis-ester and the trans-ester in the presence of ethanol at a temperature ranging from 150° to 200° C.

4. A process for the production of trans-chrysanthemic acid, which comprises converting cis-chrysanthemic acid ethyl ester in the state of a mixture with trans-chrysanthemic acid ethyl ester into the corresponding trans-ester by subjecting the said mixture of the cis-ester and the trans-ester to the action of 0.05 to 0.3 mol of an alkali metal ethoxide per 1 mol of the said mixture of the cis-ester and the transester in the presence of ethanol at a temperature ranging from 150° to 200° C., isolating the trans-ester from the reaction mixture and subjecting it to saponification.

5. A process according to claim 1, wherein the alkali metal ethoxide is sodium ethoxide or potassium ethoxide.

6. A process according to claim 2, wherein the alkali metal ethoxide is sodium ethoxide or potassium ethoxide.

7. A process according to claim 3, wherein the alkali metal ethoxide is sodium ethoxide or potassium ethoxide.

8. A process according to claim 4, wherein the alkali metal ethoxide is sodium ethoxide or potassium ethoxide.

9. A process according to claim 1, wherein the amount of ethanol is in a range of 0.5 to 10 times by weight of cis-chrysanthemic acid ethyl ester.

10. A process according to claim 2, wherein the amount of ethanol is in a range of 0.5 to 10 times by weight of cis-chrysanthemic acid ethyl ester.

11. A process according to claim 3, wherein the amount of ethanol is in a range of 0.5 to 10 times by weight of the mixture of cis-chrysanthemic acid ethyl ester and trans-chrysanthemic acid ethyl ester.

12. A process according to claim 4, wherein the amount of ethanol is in a range of 0.5 to 10 times by weight of the mixture of cis-chrysanthemic acid ethyl ester and trans-chrysanthemic acid ethyl ester.

References Cited
UNITED STATES PATENTS 3,046,299    7/1962    Julia _____ 260—468

LORRAINE A. WEINBERGER, Primary Examiner

P. J. KILLOS, Assistant Examiner

U.S. Cl. X.R.

260—514